United States Patent
Brockhaus et al.

(10) Patent No.: US 6,584,859 B1
(45) Date of Patent: Jul. 1, 2003

(54) MAGNETICALLY INDUCTIVE FLOWMETER FOR FLOWING MEDIA

(75) Inventors: Helmut Brockhaus, Dinslaken (DE); Wilhelm Florin, Duisburg (DE); Christiaan Johan Hoogendijk, Sleeuwijk (NL)

(73) Assignee: Krohne Messtechnik GmbH & Co. KG, Duisburg (DE)

( * ) Notice: Subject to any disclaimer, the term of this patent is extended or adjusted under 35 U.S.C. 154(b) by 0 days.

(21) Appl. No.: 09/053,087

(22) Filed: Apr. 1, 1998

(30) Foreign Application Priority Data

Apr. 1, 1997 (DE) .......................................... 197 13 227
Apr. 18, 1997 (DE) .......................................... 197 16 151

(51) Int. Cl.⁷ ................................................ G01F 1/58
(52) U.S. Cl. .................................. 73/861.12; 73/861.11
(58) Field of Search ........................ 73/861.11, 861.12, 73/861.15, 861.16, 861.17

(56) References Cited

U.S. PATENT DOCUMENTS

| 3,491,593 A | 1/1970 | Bailey et al. ............... 73/194 |
| 5,325,728 A | 7/1994 | Zimmerman et al. .... 73/861.12 |
| 5,469,746 A | * 11/1995 | Fukunaga et al. ....... 73/861.12 |

FOREIGN PATENT DOCUMENTS

| DE | 1 473 049 | 9/1969 |
| EP | 0 027 181 | 4/1981 |
| JP | 6 117892 | 4/1994 |

* cited by examiner

Primary Examiner—Harshad Patel
(74) Attorney, Agent, or Firm—Cesari and McKenna, LLP

(57) ABSTRACT

A magnetically inductive flowmeter for flowing media, with a measuring tube, with a magnet for generating a magnetic field passing essentially perpendicular to the axis of the measuring tube and to the direction of the magnetic field, with at least two measuring electrodes arranged along a connecting line passing essentially perpendicular to the axis of the measuring tube and to the direction of the magnetic field, with a reference electrode and with a difference amplifier having a reference potential connection connected with the measuring electrodes via measuring electrode connections and serving for amplification of the measuring voltage present on the measuring electrodes. The magnetically inductive flowmeter has lower demands for the measures for producing a reference potential because the reference potential connection of the difference amplifier is connected only with the reference electrode and the reference electrode is connected only with the reference potential connection of the difference amplifier and because the difference amplifier is not connected with a potential equalization.

11 Claims, 3 Drawing Sheets

MAGNETICALLY INDUCTIVE FLOWMETER FOR FLOWING MEDIA

The invention concerns a magnetically inductive flowmeter for flowing media, with a measuring tube with a magnet serving to generate a magnetic field passing at least essentially perpendicular to the axis of the measuring tube, with at least two measuring electrodes arranged along a connecting line passing essentially perpendicular to the axis of the measuring tube and to the direction of the magnetic field, with at least one reference electrode and with one difference amplifier connected with the measuring electrodes via measuring electrode connections, serving for amplification of the measuring voltage applied to the measuring electrodes, and having a reference potential connection. The invention also concerns a magnetically inductive flowmeter of the type described previously, in the case of which no reference electrode is provided.

BACKGROUND OF THE INVENTION

The basic principle of the magnetically inductive flowmeter for flowing media goes back to Faraday, who proposed the principle of electrodynamic induction for flow. rate measurement in 1832. According to Faraday's law of induction, an electric field strength perpendicular to the direction of flow and to the magnetic field arises in a flowing medium which carries charge carriers with it and flows through a magnetic field. This law is used in the case of a magnetically inductive flowmeter in that a magnet, regularly consisting of two magnetic coils, generates a magnetic field perpendicular to the direction of flow in the measuring tube. Within this magnetic field, each volume element of the flowing medium moving through the magnetic field makes a contribution with the field strength arising in this volume element to the measurement voltage shunted off via the measuring electrodes. In the case of the known magnetically inductive flowmeters, the measuring electrodes are designed so that they are coupled either galvanically or capacitatively with the flowing medium. A special feature of magnetically inductive flowmeters is the proportionality between the measurement voltage and the rate of flow of the medium determined over the cross-section of the tube, that is, the proportionality between measuring voltage and volume current.

In the case of the known magnetically inductive flowmeters upon which the invention is based, the measuring voltage appearing between the measuring electrodes is amplified via electronic difference amplifiers, the difference amplifiers operating with respect to a reference potential, which usually corresponds to the ground potential. For this purpose, the reference potential connection of the difference amplifiers is connected directly with a potential equalization which is at ground potential. At the same time, the flowing medium is also connected with the potential equalization via reference potential rings or reference potential electrodes, so that the flowing medium also lies at the reference potential. Since the reference potential usually is the ground potential, usually the reference potential rings are designated as grounding rings and the reference potential electrodes are designated as grounding electrodes; this terminology is also used below.

The measuring tube of a magnetically inductive flowmeter is always made to be insulating in the area of the measuring electrodes. According to the prior art, grounding rings, which are in annular electrical contact with the flowing medium, are regularly mounted outside of this area. These grounding rings are connected with the already-mentioned potential equalization, so that the potential of the flowing medium is at the reference potential, usually the ground potential. In the case of industrial use of a magnetically inductive flowmeter, frequently high currents appear between the grounding rings and the potential equalization, in particular because of inductive couplings. The grounding rings have to have high chemical resistance and therefore result in correspondingly high costs in the case of greater nominal widths of the rings. The cost of the grounding rings in this case actually can amount to as much as the entire cost of the rest of the components of the magnetically inductive flowmeter. In addition, identical materials should always be used for the measuring electrodes and the grounding rings, since otherwise there can be electrochemical reactions, which greatly impair measurement of the flow rate. Finally, the grounding rings also create a problem since using them results in additionally possible leakage points.

In order to keep down the use of materials which is connected with potential equalization measures, it is also known from the prior art that at least one grounding electrode can be used instead of grounding rings. These grounding electrodes are used in the area of the insulated measuring tube, similar to measuring electrodes. In this case, the grounding electrodes can be made relatively easily from the same material of which the measuring electrodes are also made, so that, as a result, no electrochemical reactions appear between the measuring electrodes and the grounding electrodes. However, at least one additional possible leakage point also appears here. In the case of potential differences between the flowing media and the potential equalization, high electric currents through which the grounding electrodes dissolve in an electrolytic process, can also arise here, so that a leak would appear in the measuring tube.

SUMMARY OF THE INVENTION

Thus, the object of the invention is to provide a magnetically inductive flowmeter for flowing media, which imposes clearly lower demands on the measures for producing a reference potential.

The previously derived and indicated object is solved in accordance with the invention in the case of the initially described magnetically inductive flowmeter, in which a reference electrode is present, by means of the fact that the reference potential connection of the difference amplifier is connected only with the reference electrode and the reference electrode is connected only with the reference potential connection of the difference amplifier, and that the difference amplifier is not connected with a potential equalization. In the case of the magnetic inductive flowmeter described initially, in which a reference electrode is not present, the basic object is solved by means of the fact that the reference potential connection of the difference amplifier is connected only with at least one measuring electrode and that the difference amplifier is not connected with a potential equalization. In both cases, it can be a matter of a potential equalization which is usually at ground potential.

The measures in accordance with the invention ensure that the difference amplifier operates as a reference potential as compared with the potential of the flowing medium, but the potential of the flowing medium does not necessarily because of a connection with a potential equalization have to be at a general reference potential, in particular the ground potential. Thus, on the one hand, it is assured that the difference amplifier, provided that it is designed sufficiently voltage-resistant, can operate cleanly, without high common mode voltages, and, on the other hand, it is assured that no high currents have to be shunted off between the flowing medium and the potential equalization which is, e.g., at ground potential. Potential fluctuations of the flowing medium which appear are not shunted off in the case of the design in accordance with the invention, but made available to the difference amplifier as a reference potential via its reference potential connection, so that the latter can amplify the potentials applied to its measuring electrode connections relative to one another and at a definite distance from the potential of the flowing medium.

In the case of the embodiment of the magnetically inductive flowmeter in accordance with the invention, in the case of which a—special—reference electrode is not present, preferably the reference potential connection of the difference amplifier is connected with both measuring electrodes in each case via a resistor.

By means of this arrangement of two resistors, which are preferably identical, it is ensured that the standardized potential of the flowing medium is applied to the reference potential connection of the difference amplifier. Since the signal source in the form of the measuring electrode is high-resistive in the case of a magnetically inductive flowmeter, the arrangement of the resistors is advantageous in order to ensure that a sufficient usable measuring voltage is applied to the difference amplifier.

In the case of the previously explained embodiment of the invention, interference voltages can arise between the flowing medium and the potential equalization because of the missing direct low-resistance electrical connection between the flowing medium and the potential equalization which is at ground potential. These interference voltages should preferably not drop via the difference amplifier, but via a capacitance between the reference potential connection of the difference amplifier and the potential equalization. This desired drop is ensured by means of the fact that the capacitance between the reference potential connection of the difference amplifier and the potential equalization, as a rule the ground potential, is as low as possible.

In order to ensure a high measuring accuracy in the case of a magnetically inductive flowmeter designed in accordance with the invention, it is further advantageous if the difference amplifier has an initial resistance between the measuring electrode connections exceeding the input resistance between the measuring electrode connections and the reference potential connection by at least a factor of 5. In particular, when the reference potential connection of the difference amplifier is connected with at least one of the measuring electrodes, the input resistance between the measuring electrode connections and the reference potential connection should be as small as possible as compared with the input resistance between the measuring electrode connections. The increase in the accuracy of measurement in this case results from the already-mentioned fact that the measuring electrodes are a high-resistive signal source.

In order to obtain an especially high input resistance between the measuring electrode connections and a low input resistance between the measuring electrode connections and the reference potential connection, the difference amplifier is characterized by the fact that the latter has two operational amplifiers in each case connected with their non-inverting inputs with one of the measuring electrode connections. The two operational amplifiers both have two common mode input resistors connected between the measuring electrode connections and the reference potential connection, in each case a positive feedback resistor connected between the outputs of the operational amplifiers and the respective center tap of the common mode input resistors, and in each case an amplification-increasing resistor connected between the outputs of the operational amplifier and the inverting inputs of the operational amplifiers. Furthermore, the two operational amplifiers both have at least one amplification-limiting resistor connected between the inverting inputs of the operational amplifier. Preferably, the difference amplification of the operational amplifiers here is greater than their common mode amplification.

So that in each case the common mode input resistor connected with one of the measuring electrode connections has a clearly higher resistance than the common mode input resistor connected with the reference potential, the input resistance of the difference amplifier between the measuring electrode connections and the reference potential connection essentially corresponds to the resistance of the common mode resistor connected with one of the measuring electrode connections. These common mode input resistors in each case connected with one of the measuring electrode connections are bootstrapped via the respectively associated positive feedback resistor and the common mode input resistor connected with the reference potential connection.

For compensation of tolerances between the values of the individual resistors, it is advantageous that in each case a compensation resistor is connected between the center tap of the common mode input resistors and the reference potential connection. The tolerances can be compensated by means of this compensation resistor if the resistor is appropriately dimensioned.

The already mentioned tolerances of the resistors used in the difference amplifier could lead to an asymmetry of the difference amplifier. A symmetrizing resistor is connected in series to the reference potential connection in order to reduce this asymmetry. This symmetrizing resistor exclusively influences the input resistance between the measuring electrode connections and the reference potential connection of the difference amplifier.

Finally, a further advantageous design of the difference amplifier used in a magnetically inductive flowmeter in accordance with the invention has at least the low-resistance common mode input resistors, the positive feedback resistors, the amplification increasing resistors, and the amplification limiting resistor made on at least one substrate by means of thin film technology. The tolerances in the parts per mil range which can be realized with this technology as a result make it possible to achieve the desired very high input resistance between the measuring electrode connections.

In particular there are now different possibilities for designing and further developing the magnetically inductive flowmeter in accordance with the invention. These are indicated, on the one hand, by the dependent patent claims and, on the other hand, by the description of preferred embodiments in connection with the drawings.

DETAILED DESCRIPTION OF AN ILLUSTRATIVE EMBODIMENTS

Figure 1:
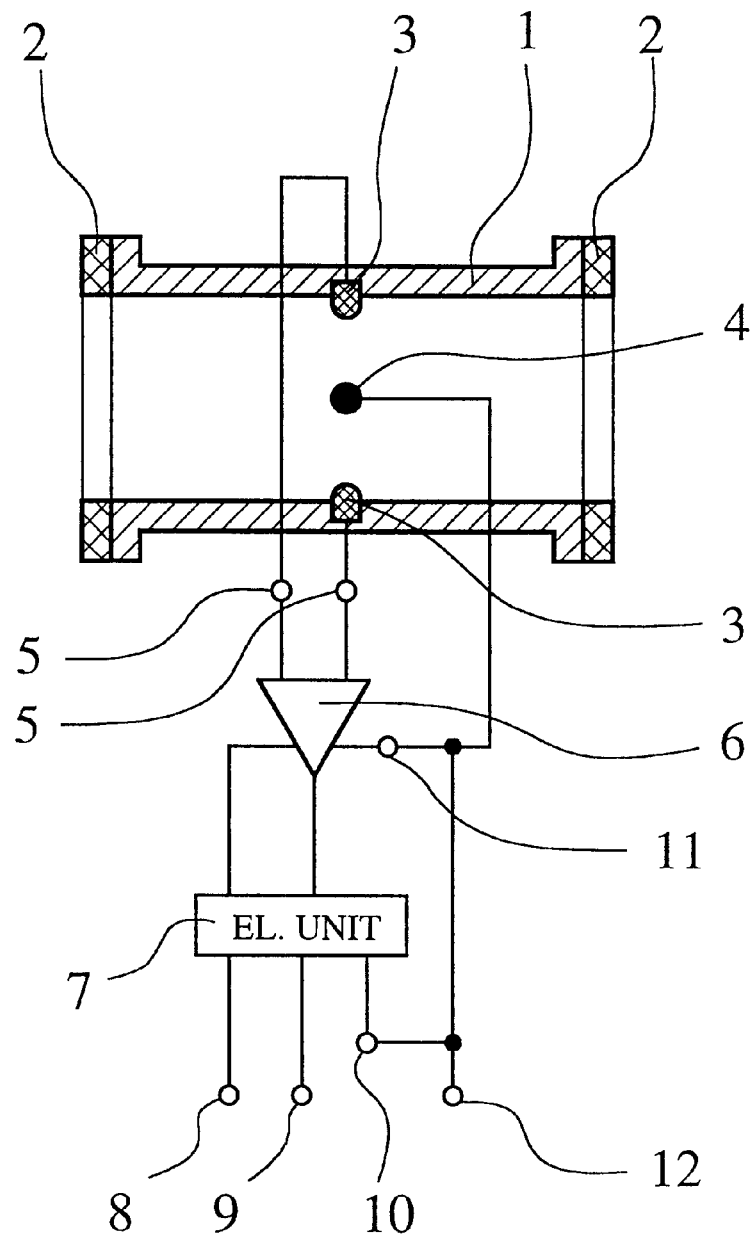
FIG. 1 shows schematically a magnetically inductive flowmeter known in accordance with the prior art.

FIG. 1 shows a magnetically inductive flowmeter for flowing media known from the prior art, with a measuring tube 1, seals 2 for connecting the measuring tube 1 to a surrounding pipeline system not shown, magnets (not shown) serving to generate a magnetic field passing perpendicular to the axis of the measuring tube 1, two measuring electrodes 3 arranged along a connecting line passing perpendicular to the axis of the measuring tube 1 and to the direction of the magnetic field, a reference electrode 4 and a difference amplifier 6 connected with the measuring electrodes 3 via measuring electrode connections 5 and serving to amplify the measuring voltage applied to the measuring electrodes 3. Further, FIG. 1 shows an electronic unit 7 for further processing, with one or more output connections 8, one or more supply connections 9, and a potential equalization connection 10. The electronic unit 7 is generally connected with the magnetically inductive flowmeter. In the case of the magnetically inductive flowmeter known from the prior art and shown in FIG. 1, the reference electrode 4, the potential equalization connection 10 of the electronic unit 7, and the reference potential connection 11 of the difference amplifier 6 are connected with a potential equalization 12 which is at ground potential. Thus, in the case of the magnetic inductive flowmeter known from the prior art, the potential of the flowing medium always is kept at ground potential. Since especially in the industrial area that strong electromagnetic fields appear in the vicinity of a magnetically inductive flowmeter, the current flowing between the reference electrode 4 and the potential equalization 12 reaches quite considerable values, which lead to a strong electrochemical loading of the reference electrode 4.

Figure 2:
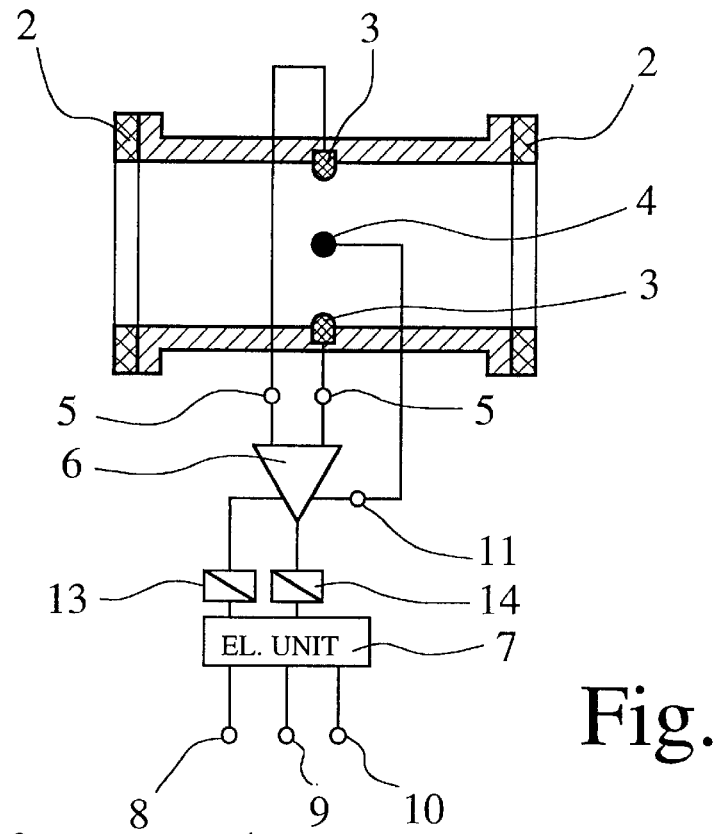
FIG. 2 shows schematically a first embodiment of a magnetically inductive flowmeter in accordance with the invention.

As opposed to this, FIG. 2 shows a magnetically inductive flowmeter for flowing media designed in accordance with the invention, in the case of which the identical components are provided with identical reference numbers.

In accordance with the invention the first embodiment of a magnetically inductive flowmeter shown in FIG. 2 is designed in such a way that the reference potential connection 11 of the difference amplifier 6 is connected only with the reference electrode 4, and reference electrode 4 is connected only with the reference potential connection 11 of the difference amplifier 6, and that the difference amplifier 6 is not connected with a potential equalization, therefore, in particular, it is designed to be separated with respect to potential from the ground potential. For this reason, the difference amplifier 6 in the embodiment is connected with the electronic unit 7 only via optical couplers 13, 14. Of course, the electrical potential separation alternatively can also be made via transformers. Since, in the case of the first embodiment of a magnetically inductive flowmeter in accordance with the invention shown in FIG. 2, the reference electrode 4 is connected exclusively with the reference potential connection 11 of the difference amplifier 6, only very small currents, essentially determined by the difference amplifier 6, flow via the reference electrode 4. Correspondingly, the reference electrode 4 is subjected only to minor electrochemical loading, and as a result, the reference electrode 4 can consist of an economical, chemically clearly less loadable material than the one necessary in the prior art.

Figure 3:
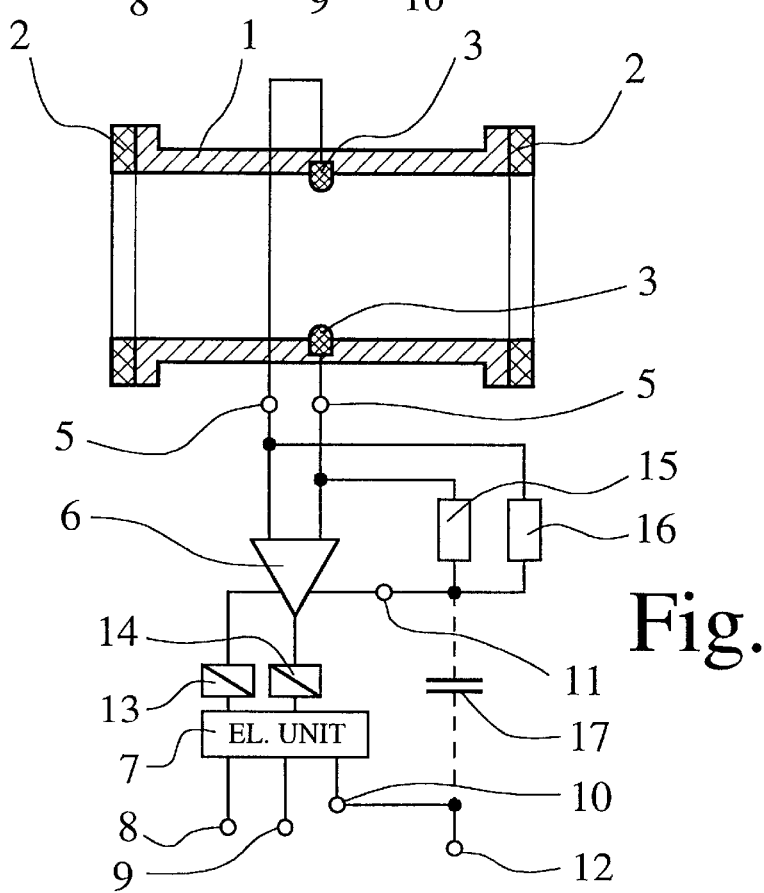
FIG. 3 shows schematically a second embodiment of a magnetically inductive flowmeter in accordance with the invention.

The second embodiment of a magnetically inductive flowmeter in accordance with the invention, shown in FIG. 3, differs from the first embodiment in that a special reference electrode is not present, and the reference potential connection 11 of the difference amplifier 6 is connected with both measuring electrodes 3 in each case via a resistor 15, 16. In this case, interference voltages arise as a result of the missing low-resistance electrical connection between the flowing medium and the potential equalization 12. Preferably, these interference voltages should not drop via the difference amplifier 6, but via the capacitance 17 between the reference potential connection 11 of the difference amplifier 6 and the potential equalization 12. Correspondingly, the indicated capacitance 17 is to be kept as low as possible. In addition, the input resistance of the difference amplifier 6 between the measuring electrode connections 5 and the reference potential connection 11 is to be kept as low as possible, and the input resistance between the measuring electrode connections 5 is to be kept as high as possible.

Figure 4:
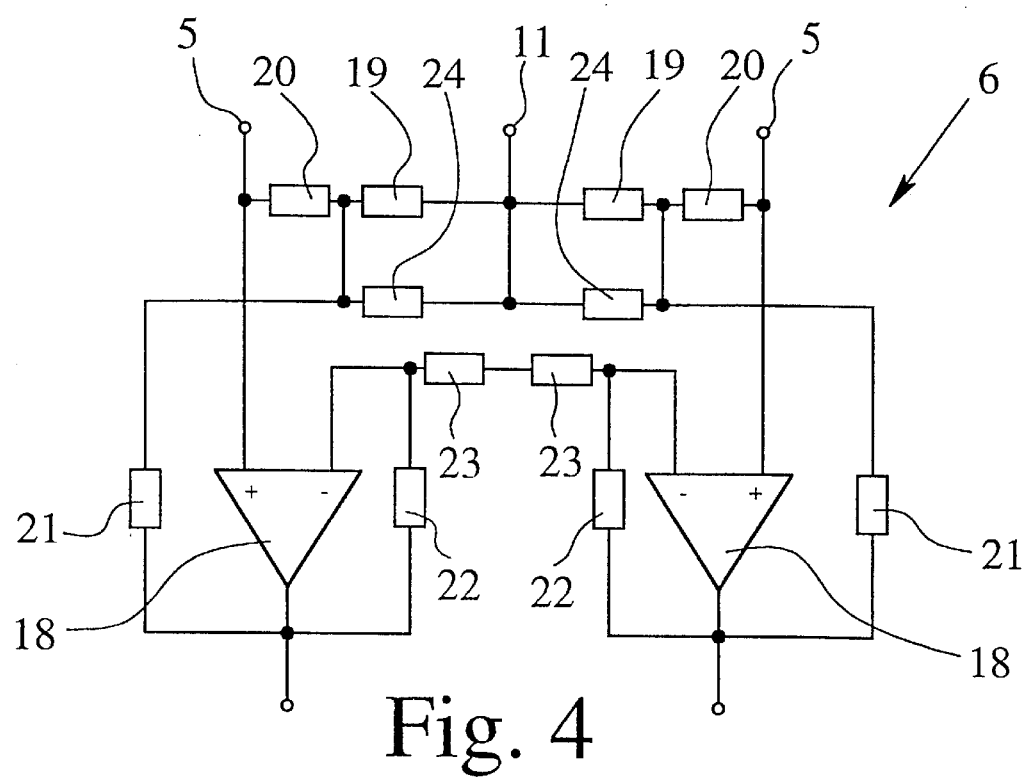
FIG. 4 shows a circuit diagram of a first embodiment of a difference amplifier to be used in a magnetically inductive flowmeter in accordance with the invention.

A first embodiment of a suitable difference amplifier 6 to be used in a magnetically inductive flowmeter in accordance with the invention is shown in FIG. 4. The difference amplifier 6 has two operational amplifiers 18 both connected with their non-inverting inputs with one of the measuring electrode connections 5. The two operational amplifiers both have two common mode resistors 19, 20 connected between the measuring electrode connections 5 and the reference potential connection 11, in each case a positive feedback resistor 21 is connected between the outputs of the operation amplifiers 18 and the respective center tap of the common mode input resistors 19, 20, and in each case an amplification-increasing resistor 22 is connected between the outputs of the operational amplifiers 18 and the inverting inputs of the operational amplifiers 18. Furthermore, two amplification limiting resistors 23 are connected between the inverting inputs of the two operational amplifiers 18. From the circuit for the difference amplifier 6 described, it follows that the operational amplifiers 18 are connected with a common mode amplification of $v_{cm}=1$ and a difference amplification of $$V_{dm}=(R_{22}+R_{23})/R_{23} \qquad \text{Equation 1}$$

The input resistance of the difference amplifier 6 between the measuring electrode connections 5 and the reference potential connection 11 essentially corresponds to the resistance of the common mode resistor 20, which is bootstrapped via common mode input resistor 19 and the positive feedback resistor 21. In this case, the common mode resistor 19 is essentially of a lower resistance than the common mode input resistor 20. The compensation resistor 24 additionally connected between the center tap of the common mode resistors 19, 20 and the reference potential connection 11 only serves for compensation of tolerances.

In the case of the circuit for the described difference amplifier 6, the following equation obtains for the input resistance between the measuring electrode connections 5:

$$R_{diff}=2*R_{20}/\{1-[(R_{22}+R_{23})/R_{22}*R_{19}/(R_{21}+R_{19})]\} \qquad \text{Equation 2}$$

For $R_{22}/R_{23}=R_{21}/R_{19}$, the input resistance between the measuring electrode connections 5 is very great; it is determined only by the resistance tolerances. By appropriate dimensioning, the input resistance between the measuring electrode connections 5 can be increased to up to 100 times the resistance of the common mode resistor 20. As compared with this, the following equation obtains for the input resistance between the measuring electrode connections 5 and the reference potential connection 11

$$R_{com}=0.5*(R_{20}+R_{19}) \quad \text{Equation 3}$$

Figure 5:
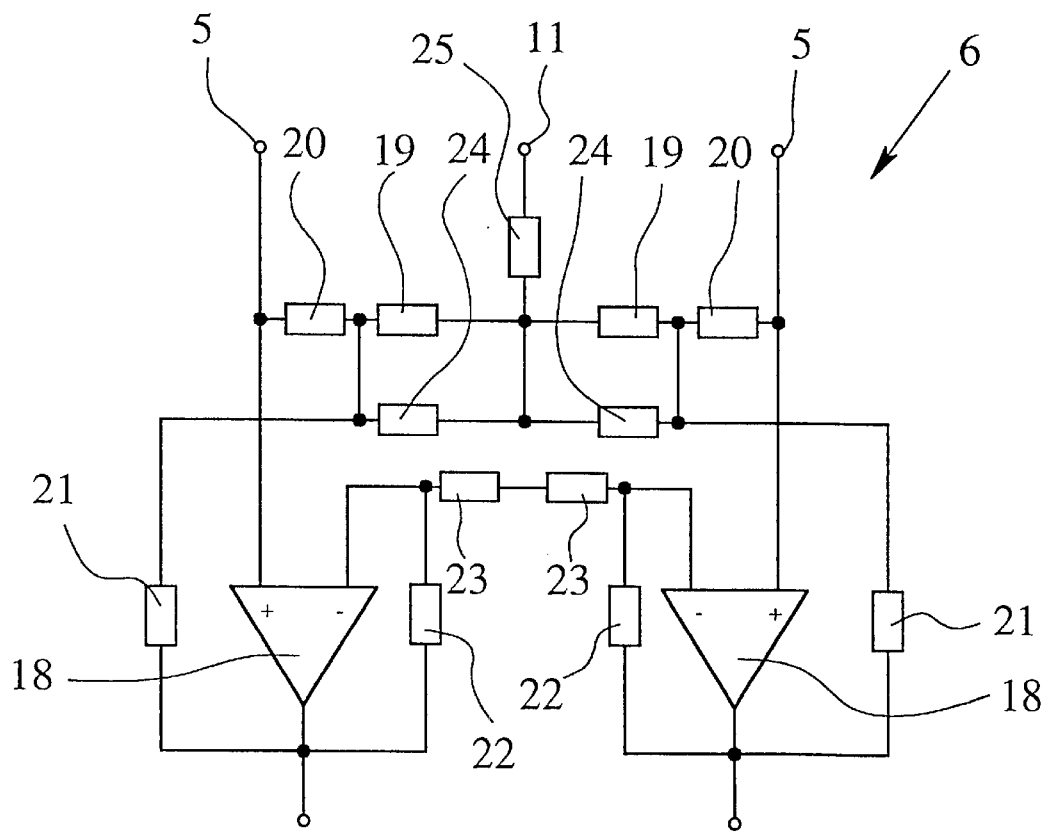
FIG. 5 shows a circuit diagram of a second embodiment of a difference amplifier to be used in a magnetically inductive flowmeter in accordance with the invention.

Finally, FIG. 5 schematically shows a second embodiment of a difference amplifier 6 to be used in a magnetically inductive flowmeter in accordance with the invention. In addition to the components which belong to the difference amplifier 6 in accordance with FIG. 4, in the case of the second embodiment of a difference amplifier 6 shown in FIG. 5, only a symmetrizing resistor 25 is connected in series to the reference potential 11, so that the sensitivity of the difference amplifier 6 is reduced as compared with asymmetries caused by resistance tolerances. Furthermore, Equation 2 is valid for the input resistance between the measuring electrode connections 5, while the following now is valid for the input resistance between the measuring electrode connections 5 and the reference potential connection 11

$$R_{com}=0,5*(R_{20}+R_{19}+2*R_{25}) \quad \text{Equation 4}$$

It will thus be seen that the objects set forth above among those made apparent from the preceding description are efficiently attained. Also, certain changes may be made in the above constructions set forth without departing from the scope of the invention. Therefore, it is intended that all matter contained in the above description or shown in the accompanying drawings shall be interpreted as illustrative and not in a limiting sense.

It should also be understood that the following claims are intended to cover all of the generic and specific features of the invention described herein.

What is claimed is:

1. A magnetically inductive flowmeter for flowing media, with a measuring tube (1), with a magnet for generating a magnetic field passing at least essentially perpendicular to the axis of the measuring tube, with at least two measuring electrodes (3) arranged along a connecting line passing essentially perpendicular to the axis of the measuring tube and to the direction of the magnetic field, with a reference electrode (4) and with a difference amplifier (6) having a reference potential connection (11) and connected with the measuring electrodes (3) via measuring electrode connections (5) and serving for amplifying the measuring voltage applied to the measuring electrodes (3), wherein the reference potential connection (11) of the difference amplifier (6) is connected only with the reference electrode (4) and the reference electrode (4) is connected only with the reference potential connection (11) of the difference amplifier (6), and the difference amplifier (6) is not connected with a potential equalization.

2. A magnetically inductive flowmeter for flowing media, with a measuring tube (1), with a magnet for generating a magnetic field passing at least essentially perpendicular to the axis of the measuring tube, with at least two measuring electrodes (3) arranged along a connecting line passing essentially perpendicular to the axis of the measuring tube and to the direction of the magnetic field, and with a difference amplifier (6) having a reference potential connection (11) and connected with the measuring electrodes (3) via measuring electrode connections (5) and serving for the amplification of the measuring voltage present on the measuring electrodes (3), wherein the reference potential connection (11) of the difference amplifier (6) is connected only with at least one measuring electrode (3), and the difference amplifier (6) is not connected with a potential equalization.

3. A magnetically inductive flowmeter in accordance with claim 2, wherein the reference potential connection (11) of the difference amplifier (6) is connected with both measuring electrodes (3) in each case via a resistor (15, 16).

4. A magnetically inductive flowmeter in accordance with claim 2 or 3, wherein a capacitance (17) is present between the reference potential connection (11) and a potential equalization (12), said capacitance being as low as possible.

5. A magnetically inductive flowmeter in accordance with any one of the claims 1 to 3, wherein the difference amplifier (6) has an input resistance between the measuring electrode connections (5), exceeding the input resistance between the measuring electrode connections (5) and the reference potential connection (11) by at least a factor of 5.

6. A magnetically inductive flowmeter in accordance with any one of the claims 1 to 3, wherein the difference amplifier (6) has two operational amplifiers (18), both operational amplifiers (18) connected with their non-inverting inputs with one of the measuring electrode connections (5), both operational amplifiers (18) having two common mode input resistors (19, 20) connected between the measuring electrode connections (5) and the reference potential connection (11), both operational amplifiers (18) with a positive feedback resistor (21) connected between the respective output of the operational amplifiers (18) and the respective center tap of the common mode input resistors (19, 20), both operational amplifiers (18) having an amplification-increasing resistor (22) connected between the outputs of the operational amplifiers (18) and the inverting inputs of the operational amplifiers (18), and with at least one amplification limiting resistor (23) connected between the inverting inputs of the two operational amplifiers (18).

7. A magnetically inductive flowmeter in accordance with claim 6, wherein the difference amplification of the operational amplifiers (18) is greater than their common mode amplification.

8. A magnetically inductive flowmeter in accordance with claim 6, wherein in each case the common mode resistor (20) connected with one of the measuring electrode connections (5) has a clearly higher resistance than the common mode resistor (19) connected with the reference potential connection (11).

9. A magnetically inductive flowmeter in accordance with claim 6, wherein in each case a compensation resistor (24) is connected between the center tap of the common mode resistor (19, 20) and the reference potential connection (11).

10. A magnetically inductive flowmeter in accordance with claim 6, wherein a symmetrizing resistor (25) is connected in series to the reference potential connection (11).

11. A magnetically inductive flowmeter in accordance with claim 6, wherein at least the low-resistance common mode resistors (19), the positive feedback resistors (21), the amplification increasing resistors (22) and the amplification limiting resistor (23) are made on at least one substrate by means of thin film technology.

* * * * *